United States Patent
Jones et al.

(10) Patent No.: US 7,047,816 B2
(45) Date of Patent: May 23, 2006

(54) OPTICAL DIFFERENTIAL PRESSURE TRANSDUCER UTILIZING A BELLOWS AND FLEXURE SYSTEM

(75) Inventors: Richard T Jones, Hamden, CT (US); James R Dunphy, South Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 103 days.

(21) Appl. No.: 10/393,557

(22) Filed: Mar. 21, 2003

(65) Prior Publication Data

US 2004/0182166 A1    Sep. 23, 2004

(51) Int. Cl.
    *G01L 7/06*    (2006.01)
(52) U.S. Cl. .................................................. 73/729.1
(58) Field of Classification Search ................. 73/716, 73/736, 729.1, 705
    See application file for complete search history.

(56) References Cited

U.S. PATENT DOCUMENTS

| | | | | |
|---|---|---|---|---|
| 4,932,263 A * | 6/1990 | Wlodarczyk | ................ | 73/705 |
| 5,348,019 A | 9/1994 | Sluss, Jr. et al. | | |
| 5,569,856 A * | 10/1996 | Jacobs-Cook | ................ | 73/702 |
| 5,844,667 A * | 12/1998 | Maron | ....................... | 356/35.5 |
| 6,175,108 B1 * | 1/2001 | Jones et al. | ............ | 250/227.14 |
| 6,229,827 B1 * | 5/2001 | Fernald et al. | ................ | 372/20 |
| 6,278,811 B1 * | 8/2001 | Hay et al. | ..................... | 385/13 |
| 6,422,084 B1 * | 7/2002 | Fernald et al. | ................ | 73/705 |
| 6,439,055 B1 | 8/2002 | Maron et al. | ................ | 73/705 |
| 6,490,931 B1 * | 12/2002 | Fernald et al. | ................ | 73/705 |
| 6,519,388 B1 * | 2/2003 | Fernald et al. | ................ | 385/37 |
| 6,626,043 B1 * | 9/2003 | Bailey et al. | ................ | 73/705 |
| 6,668,656 B1 * | 12/2003 | Fernald et al. | ................ | 73/705 |

FOREIGN PATENT DOCUMENTS

| WO | WO 00/70320 | 11/2000 |
|---|---|---|
| WO | WO 02/103315 | 12/2002 |

OTHER PUBLICATIONS

U.K. Search Report, Application No. GB0406263.4, dated Aug. 11, 2004.

* cited by examiner

*Primary Examiner*—Edward Lefkowitz
*Assistant Examiner*—Andre Allen
(74) *Attorney, Agent, or Firm*—Patterson & Sheridan, L.L.P.

(57) ABSTRACT

A pressure transducer that uses a rhomboidal flexure to provide displacement amplification to an optical sensing element is disclosed. The transducer includes an optical sensor disposed between sides of the flexure. The top portion of the flexure connects to a displacement device, such as a bellows. A first pressure port provides a first pressure to the bellows. A second pressure, preferably greater than the first pressure, is ported into a housing containing the flexure, which tends to compress the bellows and pull apart or expand the flexure. Such expansion pinches or compresses the optical sensing element between the sides of the flexure, and in particular stresses an optical sensing element containing a fiber Bragg grating. Assessing the Bragg reflection wavelength of the grating allows the differential pressure to be determined, although the transducer can also be used to sense an absolute pressure. A temperature compensation scheme, including the use of additional fiber Bragg gratings and thermal compensators axially positioned to counteract thermal effects of the optical sensing element, is also disclosed.

75 Claims, 9 Drawing Sheets

OPTICAL DIFFERENTIAL PRESSURE TRANSDUCER UTILIZING A BELLOWS AND FLEXURE SYSTEM

CROSS REFERENCES TO RELATED APPLICATIONS

U.S. Pat. No. 6,422,084, entitled "Bragg Grating Pressure Sensor," contains subject matter related to that disclosed herein, and is incorporated herein by reference.

TECHNICAL FIELD

This invention relates to optical pressure sensors, and more particularly to a sensitive, temperature-compensated differential pressure transducer.

BACKGROUND ART

Optical sensors (or transducers) for the measurement of various physical parameters such as pressure and temperature often rely on the transmission of strain to a sensing element (e.g., a fiber Bragg grating (FBG) or a fiber optic coil). One such parameter that is highly desirable to measure in oil/gas well applications is differential pressure. With a differential pressure measurement, parameters such as phase fraction, phase fraction flow rate, bulk fluid flow rate, and fluid density can be directly calculated. Such measurements and methods for calculating these and other parameters using optical flow meters are disclosed in the following U.S. patents and patent applications, which are incorporated herein by reference in their entireties: application Ser. No. 10/256,760, entitled, "Distributed Sound Speed Measurements for Multiphase Flow Measurement," filed Sep. 27, 2002; application Ser. No. 10/186,382, entitled "Venturi Augmented Flow Meter," filed Jun. 28, 2002; application Ser. No. 10/115,727, entitled "Flow Rate Measurement Using Unsteady Pressures," filed Apr. 3, 2002; application Ser. No. 10/342,052, entitled "Phase Flow Measurement in Pipes Using a Density Meter," filed Jan. 14, 2003; patent U.S. Pat. No. 6,354,147, entitled "Fluid Parameter Measurement in Pipes Using Acoustic Pressures," issued Mar. 12, 2002.

Several optical sensors have been developed to measure differential pressure and which are useful in conjunction with the measuring schemes disclosed in the above-incorporated applications and patents. One example of such a sensor is found in U.S. Pat. No. 6,422,084, entitled "Bragg Grating Pressure Sensor," issued Jul. 23, 2002, which is incorporated herein by reference. As disclosed in that patent, an optical sensor such as an FBG is housed in a housing into which a first pressure is ported. The diameter of the cladding around the FBG is increased, or the FBG is formed in a large diameter cladding, to form a relatively non-bendable sensing element whose optical properties (specifically, the Bragg reflection wavelength, $\lambda_B$, of the FBG) correlates to pressure. By affixing one end of the sensing element to a flexible wall (i.e., either a bellows or a diaphragm), and by exposing the outside of the housing to a second pressure, a differential pressure measurement is achieved. Additionally, by forming the sensing element in a "dog bone" structure, in which the FBG is located at a relatively smaller cladding diameter portion, the axial stress imparted to the FBG is increased, hence providing amplification of the strain and increasing the sensitivity of the sensing element.

However, this prior art differential pressure sensor may not be sensitive enough to measure small differential pressures of interest. For example, incorporated patent application Ser. No. 10/186,382 uses a venturi (i.e., restriction) contained within the pipe (e.g., an oil/gas well production pipe) to impart a differential pressure to the fluid flowing in the pipe. As noted above, measuring this differential pressure is useful in determining several parameters of the flowing fluid. However, this pressure differential might in a given application be quite small, and therefore difficult to resolve with needed accuracy when performing flow measurements.

It is known that optical sensors are sensitive to temperatures, a point which can be deleterious when it is desired that the sensor only measure pressure effects. For example, in an FBG based optical sensor, the FBG will expand or contract in response to increases or decreases in temperature in accordance with the coefficient of thermal expansion (CTE) of the (usually) quartz FBG element. Additionally, the index of refraction of the FBG (or other waveguide) will change with temperature. A FGB, as is known, is a periodic or aperiodic variation in the effective refractive index of an optical waveguide, similar to that described in U.S. Pat. Nos. 4,725,110 and 4,807,950 entitled "Method For Impressing Gratings Within Fiber Optics," to Glenn et al. and U.S. Pat. No. 5,388,173, entitled "Method And Apparatus For Forming Aperiodic Gratings In Optical Fibers," to Glenn, which are incorporated by reference in their entireties. Changes in temperature will cause the spacing, A, of the grating in the FBG to expand or contract, and will also affect the index of refraction, both of which affects the Bragg reflection wavelength, $\lambda_B$, of the sensor. (As is known and as is explained in the incorporated references, $\lambda_B \propto 2n_{eff}\Lambda$, where $n_{eff}$ is the index of refraction of the core of the cane waveguide or optical fiber). These temperature-induced Bragg reflection wavelength shifts are preferably compensated for when the FGB is used to sense pressures.

The art would benefit from an optical differential pressure sensor capable of accurately resolving small differences in pressure, and which is minimally sensitive to temperature. Such a sensor is disclosed herein.

SUMMARY OF THE INVENTION

A pressure transducer that uses a rhomboidal flexure to provide displacement amplification to an optical sensing element is disclosed. The transducer includes an optical sensor disposed between sides of the flexure. The top portion of the flexure connects to a displacement device, such as a bellows. A first pressure port provides a first pressure to the bellows. A second pressure, preferably greater than the first pressure, is ported into a housing containing the flexure, which tends to compress the bellows and pull apart or expand the flexure. Such expansion pinches or compresses the optical sensing element between the sides of the flexure, and in particular stresses an optical sensing element containing a fiber Bragg grating. Assessing the Bragg reflection wavelength of the grating allows the differential pressure to be determined, although the transducer can also be used to sense an absolute pressure. A temperature compensation scheme, including the use of additional fiber Bragg gratings and thermal compensators axially positioned to counteract thermal effects of the optical sensing element, is also disclosed.

DETAILED DESCRIPTION OF THE PREFERRED EMBODIMENTS

Figure 1A:
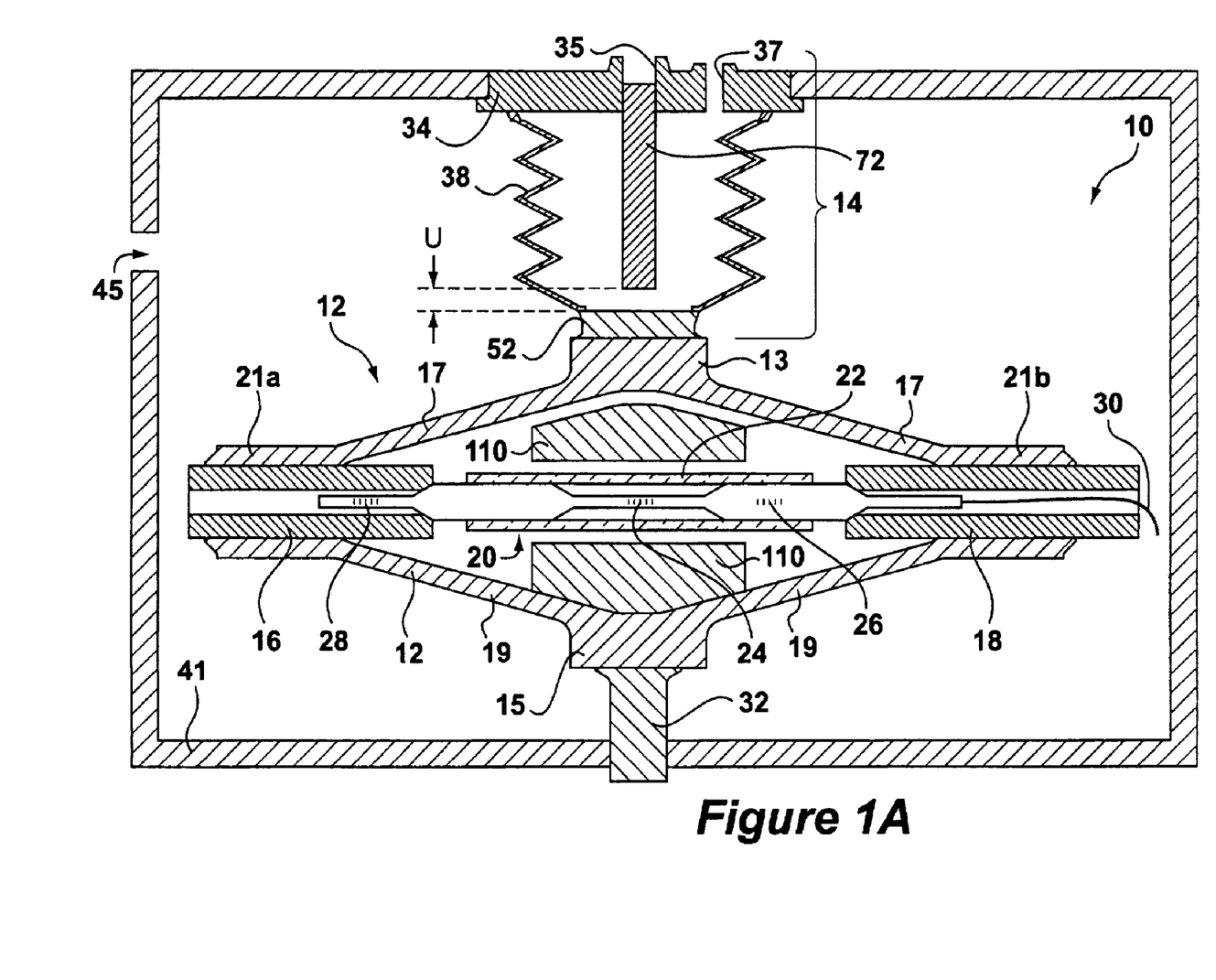
FIG. 1A illustrates a cross sectional view of the disclosed differential pressure transducer in an idealized housing.
Figure 1B:
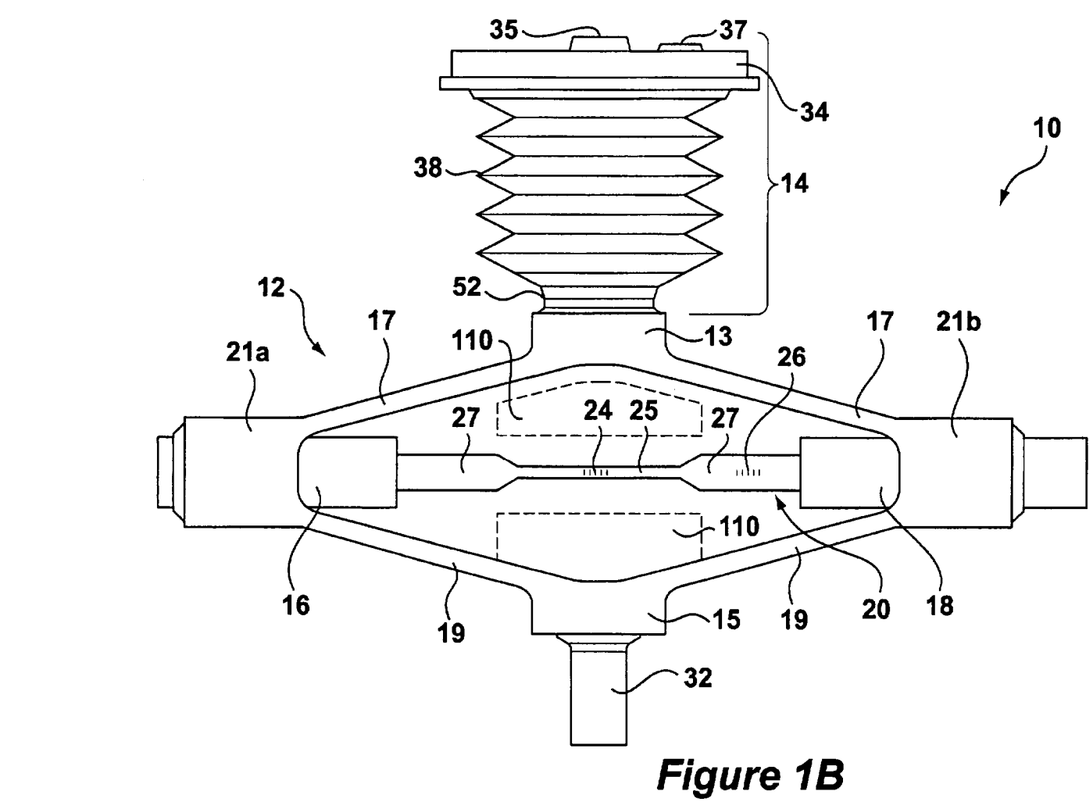
FIG. 1B illustrates a plan view of the disclosed differential pressure transducer.

FIGS. 1A and 1B respectively disclose a differential pressure transducer 10 in a cross sectional and plan view. The basic components of the transducer 10 include a rhombus-shaped flexure element or spring 12, an optical sensing element 20 containing a pressure-sensitive FBG 24, and a displacement device 14 having a bellows 38. When used to sense a differential pressure, these components are housed in a housing 41 (not shown in FIG. 1B for clarity). Further details concerning the housing 41 are disclosed later in this disclosure, but at this point a simplified illustration and discussion are provided to illustrate the basic aspects of the invention. A disk 34 is coupled to the housing 41, and includes a centrally located hole 35 and a first porthole 37 that communicates with the inside of the bellows 38. The bottom 15 of the flexure 12 is affixed to the housing at securing pin 32. Housing 41 further contains a second porthole 45.

In operation, first and second pressures, whose differential is to be measured, are respectively presented to first and second portholes 37 and 45, where the second pressure is preferably higher than the first pressure. With these pressures so presented, the bellows 38 will contract in accordance with the difference between the first and second pressures, which will draw a top portion 13 of the flexure 12 upward, and which in turn will cause first and second end portions 21a and 21b to move towards one another. This movement of the ends 21a and 21b will axially compress the optical sensing element 20, and in particular the pressure-sensitive grating FBG 24. This will cause the Bragg reflection wavelength of the FBG 24 to proportionately shift in accordance with the differential pressure.

With the basic operation of the differential pressure transducer 10 introduced, further details concerning the structure and function of the transducer are now provided, starting first with a discussion of the flexure 12. The flexure 12 is a flexible body which includes a top portion 13 affixed to the bellows 38 by an adaptor 52, which is preferably laser welded thereto, but could also be affixed by brazing, adhesive bonding or other similar technique. The bottom portion 15 is affixed to the securing pin 32 by laser welding (not shown), but can also be integrally formed with the base portion or threaded in place. The flexure 12 further includes upper arms 17 and lower arms 19, which as noted previously mechanically cooperate in a spring-like fashion.

The end portions 21a, 21b of the flexure 12 support the cylindrical optical element 20. More specifically, the first end portion 21a contains a through hole for accommodating a cylindrical Invar™ spacer 16. The second end portion 21b similarly accommodates a cylindrical temperature compensator 18, whose function will be explained in further detail later in this disclosure. As shown in FIG. 1A, both the temperature compensator 18 and the spacer 16 have beveled edges for meeting with similar edges on the optical element 20, thereby providing a good contact for axially compressing the optical element. During manufacturing, one of the compensator 18 or spacer 16 is first welded into place within its end of the flexure 12. Then the optical element is positioned through the other end of the flexure, and the other of the compensator 18 or spacer 16 positioned in place and similarly welded. The optical element is preferably axially precompressed within the flexure 12 as the second of the compensator or spacer 16 are welded in place. Precompression allows axial relaxation (i.e., tensile stress) of the optical element 20 to be assessed, which would allow the optical sensor to detect conditions in which the second pressure (i.e., within the housing 41) falls below the first pressure (i.e., ported into the bellows 38). A precompression force of approximately 5 pounds at room temperature is preferred for the oil/gas applications for which the transducer has been designed, although other free load forces can be used depending on the amount of differential pressure to be sensed and the dimensions of the components in the transducers. The temperature compensator 18 and/or the spacer 16 are preferably hollow to accommodate an optical fiber 30 that communicates with the optical sensing element 20, as will be explained in detail later.

The flexure 12 is preferably made from a high spring rate material with a low coefficient of thermal expansion, such as for example a metal alloy, Invar™, or a stainless steel material. The flexure 12 as designed provides approximately a 10–15× amplification in the differential stress imparted to the pressure-sensitive FBG 24 when compared to the direct application of the differential pressure along the axis of the optical element 20, such as occurs in the incorporated U.S. Pat. No. 6,422,084 patent. In one particular embodiment of the invention disclosed herein, the transducer provides for a differential pressure resolution of 0.0015 psi with a 0.1 pm Bragg wavelength shift of pressure-sensitive FBG 24 over a typical operating range of a 0 to 25 psi pressure differential and up to 150° C. The external package has been designed to accommodate a 15 kpsi line pressure.

Figure 1C:
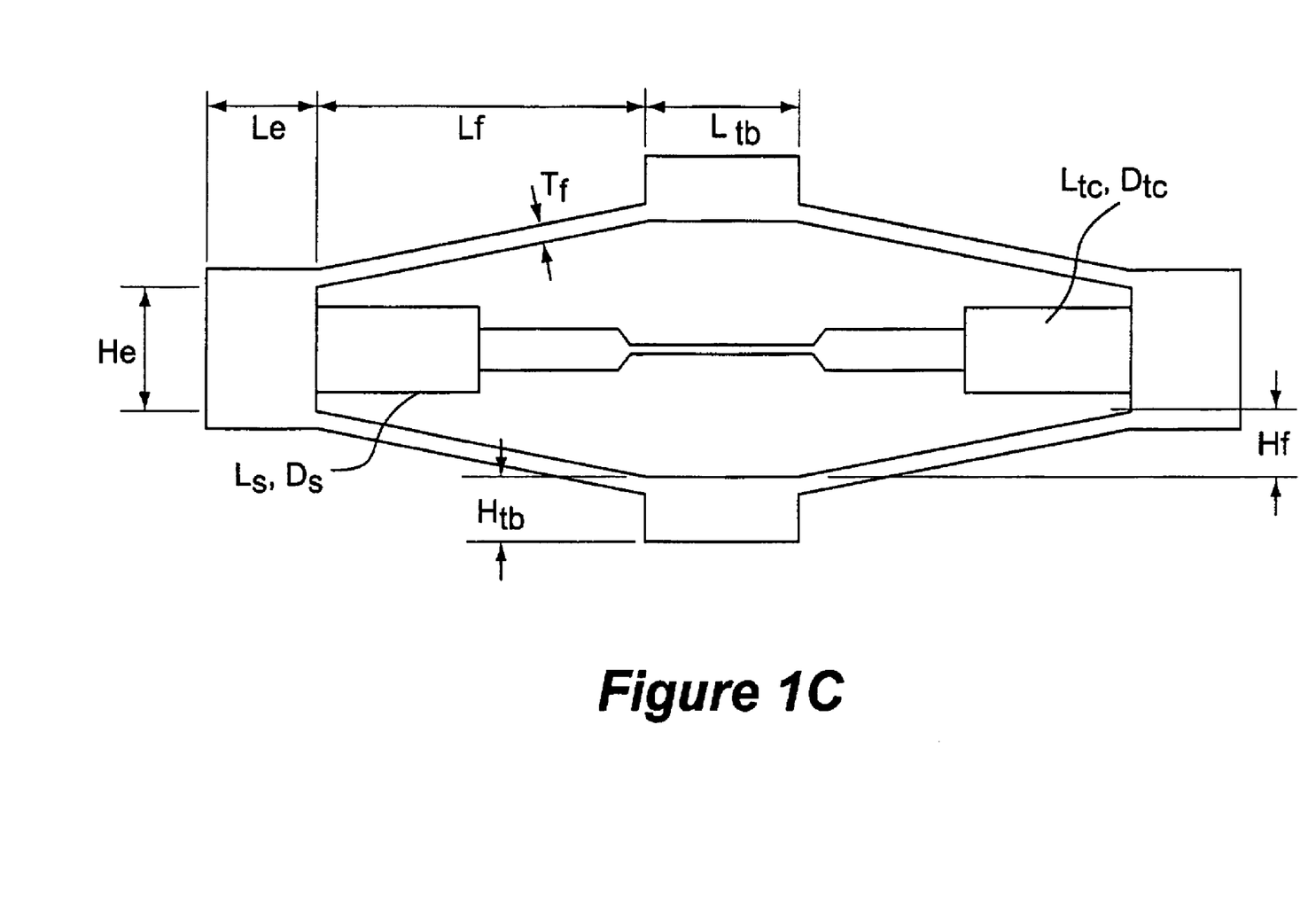
FIGS. 1C and 1D illustrate plan and perspective views the flexure element of the disclosed differential pressure transducer, including exemplary dimensions.
Figures 1D, 1E:
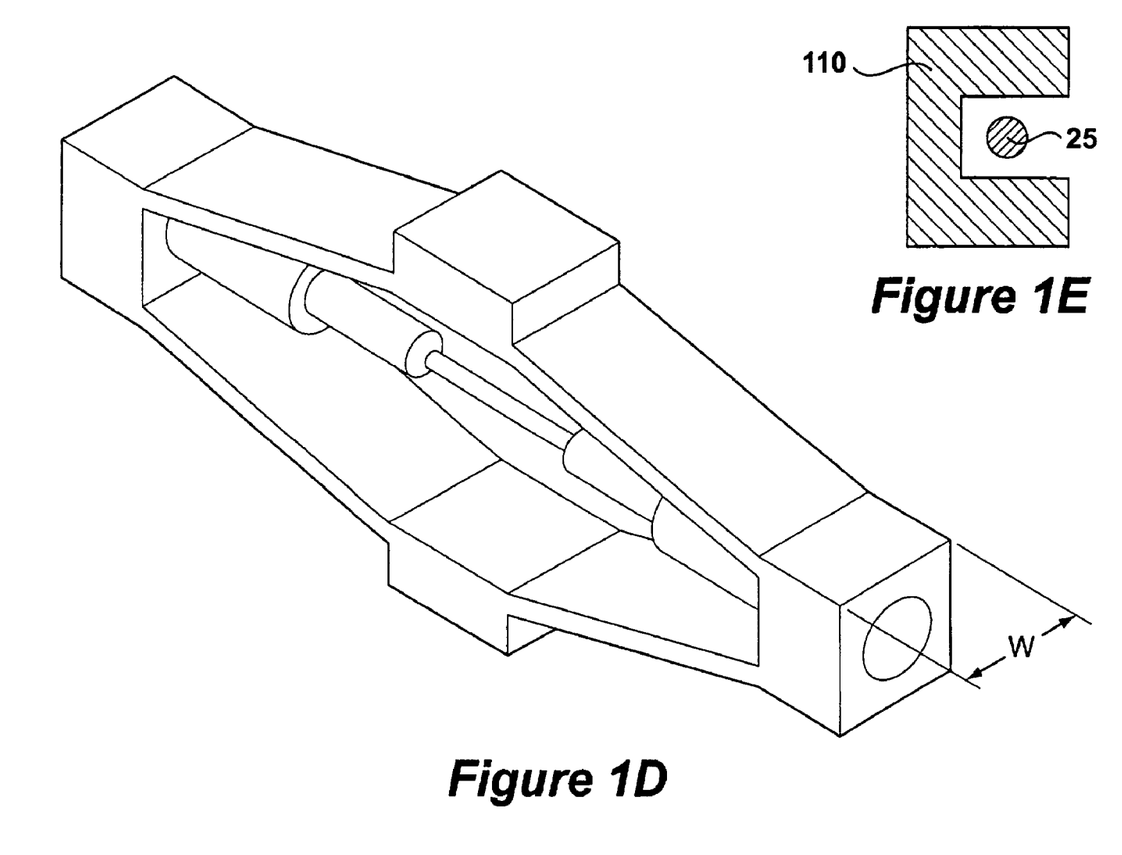
FIG. 1E illustrates a cross sectional view of a reverse pressure stop block useable to prevent overstressing of the flexure.

FIGS. 1C and 1D respectively illustrate side and perspective view of the flexure 12 to illustrate exemplary dimensions. Of course, other dimensions are possible depending on the application in which the flexure will be used. In one particular embodiment of the invention, the top and bottom portions have a length ($L_{tb}$) of 0.3 inches and a height of ($H_{tb}$) of 0.12 inches; the upper and lower arms have a length ($L_f$) of 0.645 inches, a height ($H_f$) of 0.12 inches, and a thickness ($T_f$) of 0.050 inches; the end portions have a length ($L_e$) of 0.215 inches and a height ($H_e$) of 0.25 inches. The Invar™ spacer 16 and the temperature compensator 18 can have similar dimensions, and preferably have outer diameters ($D_o$) of 0.160 inches and inner diameters ($D_i$) of 0.047 inches. The lengths of these components 16, 18 are less critical, and can vary from approximately 0.5 to 1.0 inches. The width of the flexure 12 is preferably 0.28 inches.

As briefly noted earlier, and referring again to FIGS. 1A and 1B, the displacement device 14 comprises a disk 34, a bellows 38 and an adaptor 52. The bellows 38 is designed in this particular embodiment to have approximately the same spring rate as the flexure 12, so that the compressibility of one does not appreciably predominate over the other. However, in other applications it may be desirable to design the bellows to dominate the stiffness of the system. The bellows 38, as is known, constitutes a flexible or deformable chamber or compartment and comprises a series of convolutions to assist in its compressibility, and is preferably formed of stainless steel that is approximately 0.005 inches thick. The disk 34 may be laser welded to the bellows 38 or by any other known technique for welding, brazing, adhesive bonding, or mechanical fastening. The adaptor 52 is preferably laser welded on the top portion 13 of the flexure 12, and laser welded to the bellows 38.

As noted earlier, the disk 34 allows the bellows 38 to be coupled to the housing 41, and comprises a centrally located hole 35 and an off-center porthole 37. The porthole 37 provides a passageway for fluid or air to enter through the disk 34 to exert a first pressure within the bellows 38. Hole 35 accommodates a mechanical stop device 72 (FIG. 1A) that extends within the bellows 38. The stop device 72 is preferably metallic and prevents the transducer 10 from becoming damaged in the event that the device experiences a large differential pressure, and specifically prevents the optical element 20 from buckling. In an oil/gas well application, the stop device 72 preferably limits the differential pressure sensed by the transducer to between 10 and 40 psi, which corresponds to approximately an 0.003 inch upward shift (U, FIG. 1A) in the flexure 12. The stop device 72 is preferably affixed to the disk 34 by welding, which provides a good seal and which allows the bellows 38 to communicate only through porthole 37. In some applications, the stop device 72 can be placed loosely within hole 35, and an overpressure point determined, which determines the amount of shift U that is permissible. After this point is determined, the stop device 72 can be welded into the proper position.

The transducer 10 is preferably also protected against the effects of a negative pressure differential, i.e., if the second pressure (within the housing 41) is lower than the first pressure (within the bellows 38). This condition can occur, for example, if the production tubing is perforated, or if the input pressures to the device are inadvertently reversed. If this occurs, the mechanical precompression acting upon the optical element 20 may be eliminated as the bellows 38 expands, causing the optical element 20 to become physically detached from the temperature compensator 18 and/or spacer 16. To prevent this, a reverse pressure stop block 110 (FIGS. 1A, 1B) can be employed to limit the compression of the flexure 12 due to expansion of the bellows 38 so that at least some amount of precompression is always retained. The reverse pressure stop block 110 may be cylindrical, but is preferably roughly C-shaped in cross section, as shown in FIG. 1E. The optical element 20 should be positioned within the interior of the reverse pressure stop block 110 with sufficient space such that the block 110 will not interfere with the optical element. Block 110 can be affixed to the bottom 15 of the flexure 12 by any suitable means, but should not extend so far along the bottom edges 19 of the flexure 12 as to affect its deformability.

Alternatively, in some applications, the optical sensing element 20, compensator/spacer 18/16, and the flexure 12 can be affixed together to allow tensile stresses on the optical element 20 to be assessed without risk of physical detachment of the optical element 20.

One skilled in the art would realize other displacement devices may by utilized in lieu of bellows 38, such as a diaphragm or spring mechanism.

Figure 2:
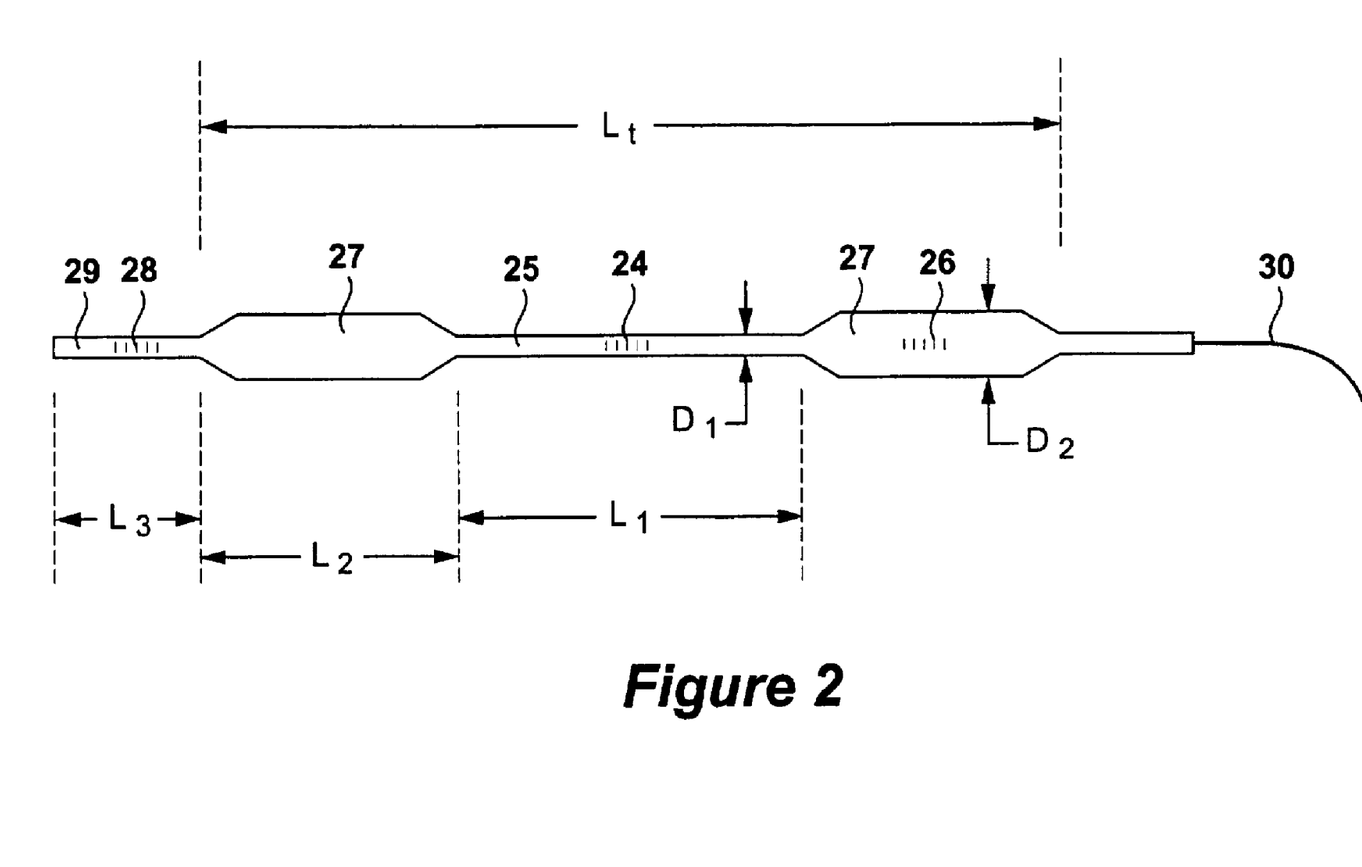
FIG. 2 illustrates an optical sensing element of the disclosed differential pressure transducer.

FIG. 2 shows the optical element 20 in isolation, which includes a pressure-sensitive FBG 24 and temperature-sensitive FBGs 26 and (optionally) 28. The optical element 20 preferably has a "dog bone" shape with a narrow central section 25 and larger outer sections referred to as pistons 27, such as is disclosed in the incorporated '084 patent. This particular embodiment of the optical element 20 has the following dimensions: the narrow section has a diameter $D_1$ of about 0.55 mm and a length $L_1$ of about 9 mm; the pistons 27 have diameters $D_2$ of about 2 mm and lengths $L_2$ of about 7 mm. Other lengths $L_1$, $L_2$ of the sections 25, 27 may be used, as long as buckling of the optical element 20 is avoided when it is compressed and the desired sensitivity is achieved. The optical element 20 may further comprise a first and/or second narrow end portion 29. The end portion 29 may have the same, or larger, diameter as the central section 25 and a length $L_3$ that is not critical. So designed, the quartz optical element 20 has a buckling factor of safety of 2 at full differential pressure and maximum service temperature.

The ratio of the cross-sectional areas ($\pi r^2$) of the pistons 27 and the narrow section 25 resulting from the dog bone shape of the optical element provides an axial force/area gain of approximately 13.2, meaning that that pressure-sensitive FBG 24 will experience a 13.2-times greater axial stress than will the pistons 27. This dog bone geometry may be formed by starting with a relatively thick optical waveguide (sometimes referred to as an optical "cane") from which the narrow portion 25 is formed by etching, grinding, or polishing; or the larger diameter portions may be formed by fusing glass tubes around a more standard diameter optical fiber. Such "dog bone" forming schemes are described which more specificity in the incorporated '084 patent. The dimensions provided herein for the optical element 20 are easily scaleable to provide the desired amount of pressure sensitivity. Other geometries to enhance sensitivity or to adjust the coupling of force from the flexure 12 to the optical element 20 may be used if desired.

FIG. 2 further discloses a temperature-sensitive FBG 26, which is located in either of the larger piston sections 27. FBG 26, like FBG 24, is sensitive to axial pressures because it is positioned in the optical sensing element 20 between the locations where the pistons 27 contact elements 16 and 18. However, the Bragg reflection wavelength shift sensitivities for the FBGs 24, 26 are different. As noted above, because of the force/gain cross sectional area difference between the piston 27 and narrow 25 section, FBG 24 will experience a Bragg wavelength shift larger than that of the FBG 26 when the optical element is subjected to axial pressure via the flexure 12. By contrast, the FBGs 24, 26 will react similarly with respect to temperature, with both experiencing the same relative amounts of Bragg wavelength shift as temperature changes. Accordingly, and as is known, by assessing the reflection wavelengths of both FBGs 24, 26, pressure and temperature effects may be analytically separated and solved for. In other words, both temperature and (differential) pressure may be determined, and/or the effects of temperature can be discarded from the pressure measurement made by the pressure-sensitive FBG 24.

Yet another means to compensate for the effects of temperature is found in second temperature-sensitive FBG 28. FBG 28 is located at either end portion 29 of the optical element 20, and is only sensitive to temperature, and not to pressure effects. This is achieved by locating FBG 28 in thermal proximity to the pressure-sensitive FBG 24, but outside the piston 27 contact areas. Temperature-sensitive FBG 28 may be located on either or both sides of the optical element 20, and/or may lie inside or outside the spacers/compensators 16/18. The second temperature-sensitive FBG 28 therefore provides an additional means for an accurate and independent temperature measurement, which can be used to calibrate and/or double check the pressure-sensitive grating 24 as is known, or simply as a means to measure the temperature should that variable be desirable to determine. It should be noted that because the temperature compensation scheme provided by FBG 28 is not impacted by mechanical stressing, and therefore will not suffer from hysteresis effects, FBG 28 may provide a better long-term temperature compensation scheme in some applications.

Although temperature effects can be compensated for using analytical methods in connection with temperature-sensitive FBGS 26 and/or 28, it would be preferable to additionally isolate the pressure-sensitive FBG 24 from the effects of temperature to improve the resolution of the differential pressure measurement, and to alleviate the need to rely on such analytical methods. The present disclosure provides such an isolation scheme. Specifically, temperature compensator 18 preferably comprises a stainless steel material that has a relatively high coefficient of thermal expansion (CTE) with low thermal conductivity. Although the compensator material can be any high CTE material, stainless steel is preferred since it is readily available, cheap, and easy to machine. Thus, when the temperature rises, the compensator 18 will expand axially while conducting relatively little heat to the optical element 20. The Invar™ spacer 16, on the other hand, has a low coefficient of thermal expansion, so the spacer 16 will not experience a significant expansion. The overall effect of this arrangement is that, as temperature increases, the spacing of the periodicity of the index of refraction perturbations ($\Lambda$) in the FBG 24 will tend to increase due to thermal expansion, but at the same time the temperature compensator 18 will also increase in physical length, which will place the FBG 24 under further compression and decrease the periodicity of the index of refraction perturbations ($\Lambda$) in FBG 24 back toward one another. Thus, the balancing of these two effects means that temperature ultimately does not appreciably affect $\Lambda$ in FBG 24. So thermally compensated, the Bragg reflection wavelength of the pressure-sensitive FBG 24 has a low sensitivity to temperature changes (<1 pm/° C.) over normal operating temperatures. As an ancillary benefit, temperature compensation allows narrower band radiation to be used to interrogate the Bragg reflection wavelength of the FBG 24 when making a differential pressure measurement.

One skilled in the art will realize that temperature compensation will be optimal when the thermal expansion effects of the thermal compensator 18 (relatively great) plus the Invar™ spacer 16 (relatively small) equal the thermal expansion effects and index of refraction changes of the optical element 20 over normal operating ranges. Thus, optimization of the CTE of these components, and/or their lengths, can be adjusted to tune or improve the extent of compensation, which may require routine experimentation in a given application. In this regard, the CTE for all constituent materials of the system are important to consider. Additionally, the wavelength shift as a function of temperature for the optical element 20 (which is equivalent to change in index of refraction over temperature) is likewise important to consider. Accordingly, prior to constructing the transducer, it is useful to characterize the CTE of each batch of material used to form the flexure 12, the Invar™ spacer 16, and the temperature compensator 18 so that slight adjustments in dimensions of these components can be made to appropriately tune the transducer. Such matching and optimization suggest that the compensator 18 and spacer 16 may be formed of the same material that is optimized to provide the necessary amount of thermal compensation. Therefore, while it is preferred that separate materials are used for these structures, this is not strictly required.

In short, the disclosed transducer 10 preferably incorporates several different means of compensating the differential pressure measurement from the effects of temperature, including FBG 26, FBG 28, and the use of the spacers/compensators 16/18 scheme. One skilled in the art will realize that any one of these temperature compensation schemes, or various combinations, or all, may be used in conjunction with the transducer 10. Regardless of the scheme used, it is preferred that the various FBGs 24, 26, 28 are formed with different grating spacing, so that they exhibit different Bragg reflection wavelengths. In so doing, the FBGs are preferably wavelength division multiplexed (WDM) and are easily resolvable from one another, although this is not strictly necessary. Temperature compensation is not strictly required to enable performance of the transducer, although it is beneficial for the reasons stated earlier.

Figure 3:
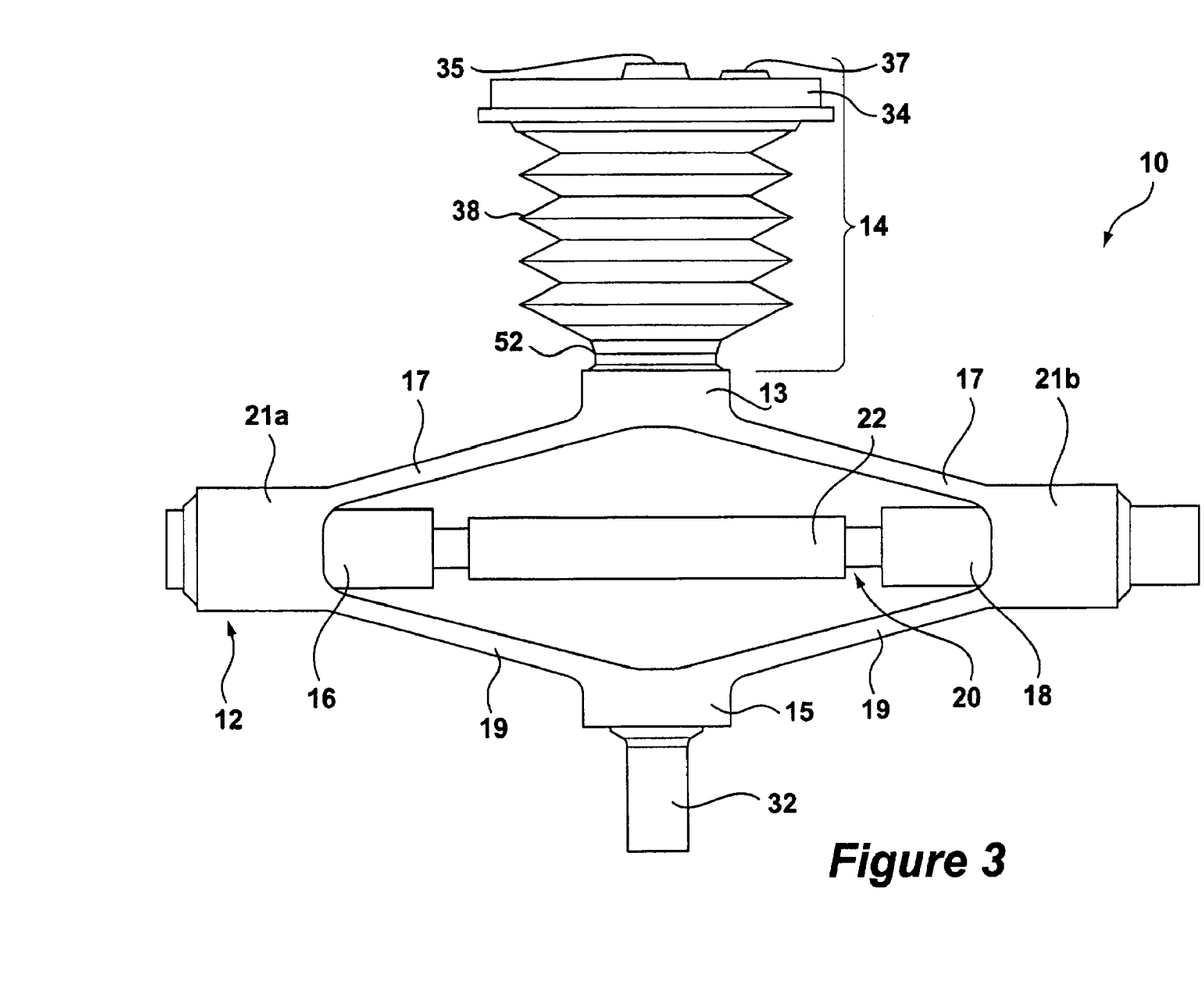
FIG. 3 illustrates a plan view of the disclosed differential pressure transducer incorporating a guide sleeve to protect and isolate the optical sensing element.

A cylindrical guide sleeve 22 (FIGS. 1A and 3) can be used to surround the narrow portion 25 of the optical element 20. The sleeve 22 prohibits bending in the narrow portion 25 of the optical element 20, which keeps the device from failing due to excessive side forces. The sleeve 22 may be formed from the same material as the optical element 20 (e.g., quartz), or may be formed from other like materials, such Pyrex® by Corning (boro silicate), or Vycor® by Corning, or other glasses or plastics. It is preferable that the CTE of the sleeve 22 match that of the optical element 20, although this is not strictly necessary. The sleeve 22 is preferably $CO_2$ laser welded to one of the piston portions 27 of the optical element 20, but is preferably not affixed to both pistons 27 to allow one of the pistons to freely slide within the sleeve 22 without significant restriction in response to axial stresses by the flexure 12. $CO_2$ laser welding of the quartz sleeve 22 and the quartz optical element 20 allows these components to melt together. The radiation from the $CO_2$ laser source is absorbed by the quartz (and similar quartz materials such as Pyrex™, borosilicate glass, Vycor™, etc.), which causes the surface temperature of the glass to heat and eventually reach its softening temperature—approximately 1200 C for fused silica. Because quartz is a poor conductor of heat and the $CO_2$ laser beam is small in diameter (3–5 mm), localized heating of the glass does transmit to adjacent sections of the optical element 20 in which the FBGs are located, which keeps the FBGs from becoming damaged. The guide sleeve 22 could also less preferably be attached by soldering, gluing, by flame or other heating methods, or by other well-known methods of attachment.

FIGS. 1A and 2 show an optical fiber 30 coupled to the optical element 20 that ultimately communicates with optical source/detection equipment (not shown). As shown, the transducer 10 is a "single-ended" device, which means that optical fiber 30 is coupled to only one side of the device. However, "dual-ended" devices capable of being multiplexed with other downstream optical devices are also contemplated. Because the end section 29 of the optical element is significantly thicker than the normal standard communications optical fiber 30, a transitionary structure of an intermediate diameter is preferably used to form the "pig tail" between the two structures. Methods for forming such intermediary structures, sometimes referred to as "large diameter splices," are disclosed in U.S. patent application Ser. No. 10/371,910, entitled "Side Hole Cane Waveguide Sensor," filed Feb. 21, 2003, which is incorporated herein by reference.

Although preferable, it is not necessary that the optical element 20 be symmetrical, or even that it be "dog bone" shaped. The dog bone shape allows for the axial strain presented to the pressure-sensitive FBG 24 to be amplified as explained earlier, but this is not strictly necessary, as the device would still function even if FBG 24 did not occur at a narrowed portion 25 of the optical element 20 and hence was not amplified in this manner.

Figure 4A:
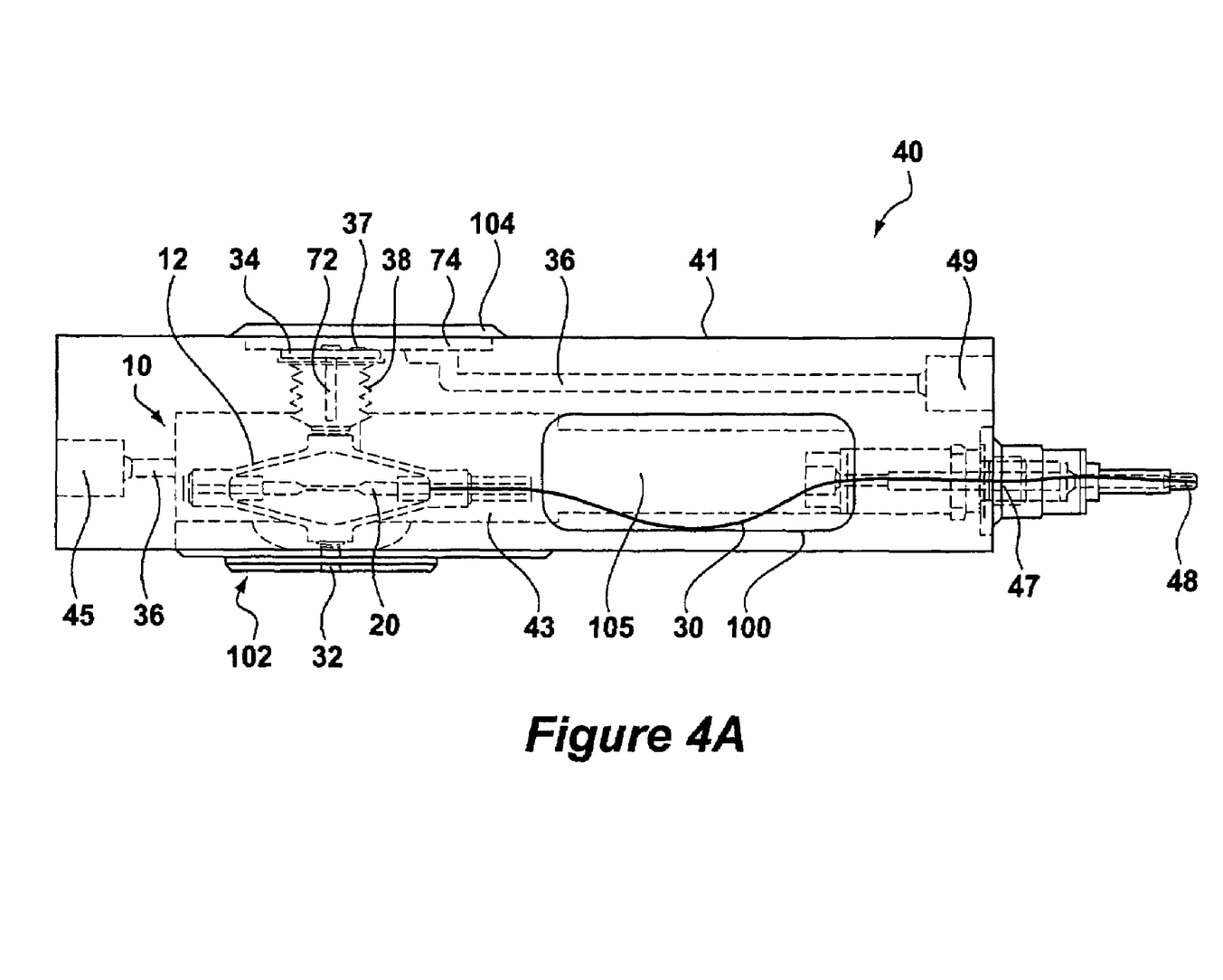
FIGS. 4A and 4B illustrate see-through and perspective views of a differential pressure transducer assembly including a housing suitable for deployment down and oil/gas well.
Figure 4B:
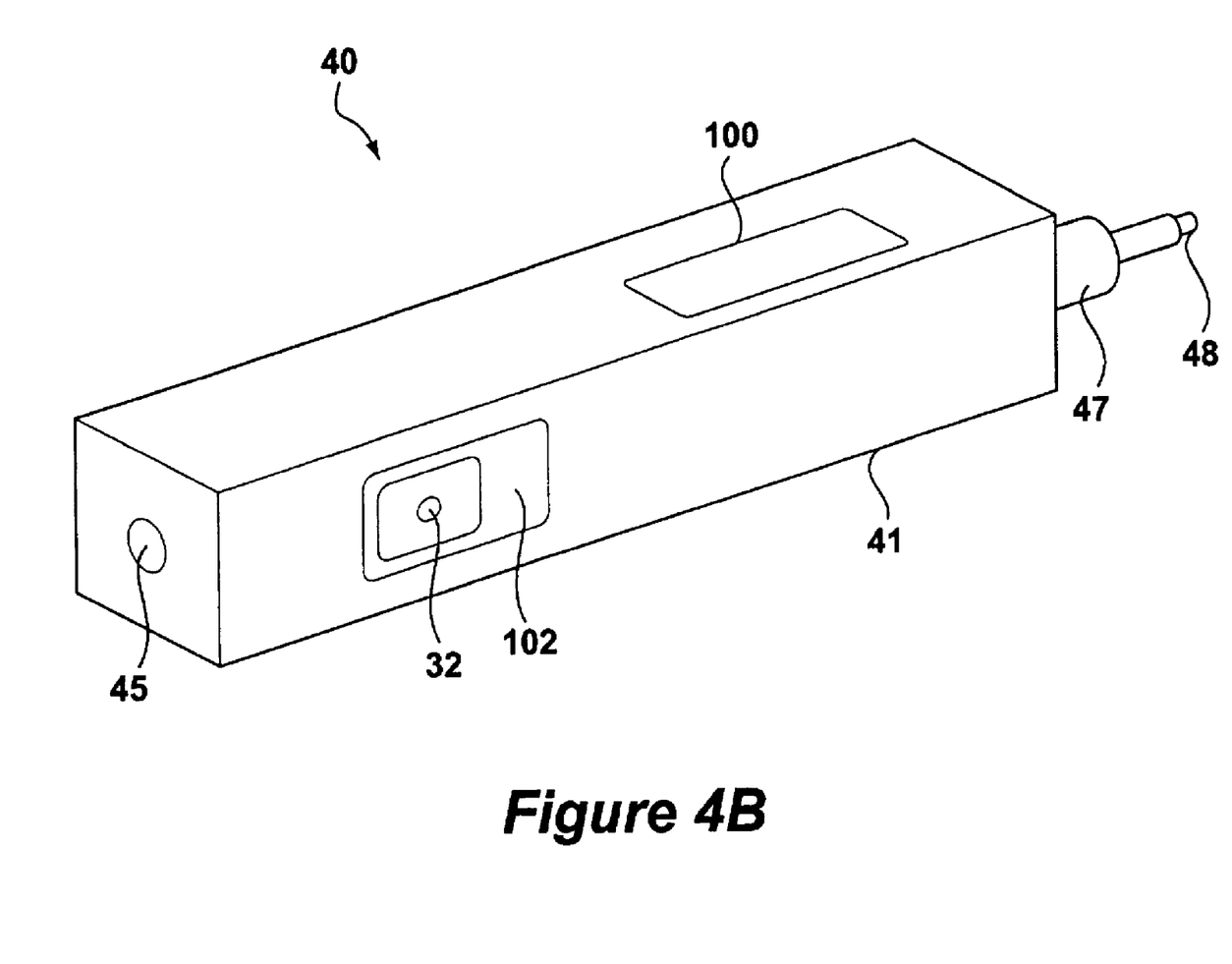

FIGS. 4A and 4B illustrate a differential pressure assembly 40, and in particular further details of the housing 41 for the differential pressure transducer 10 as it would preferably be used in a commercial setting, e.g., when deployed in an oil/gas well. The housing 41 in one particular embodiment constitutes Inconel 718 and initially constitutes a solid block measuring approximately 6.0 by 1.5 by 1.0 inches from which various chambers and channels are milled to house assembly's internal components. This relatively small size allows the assembly 40 to be deployed within the annulus of a typical oil/gas well to make measurements as will be explained in further detail shortly.

Figure 5:
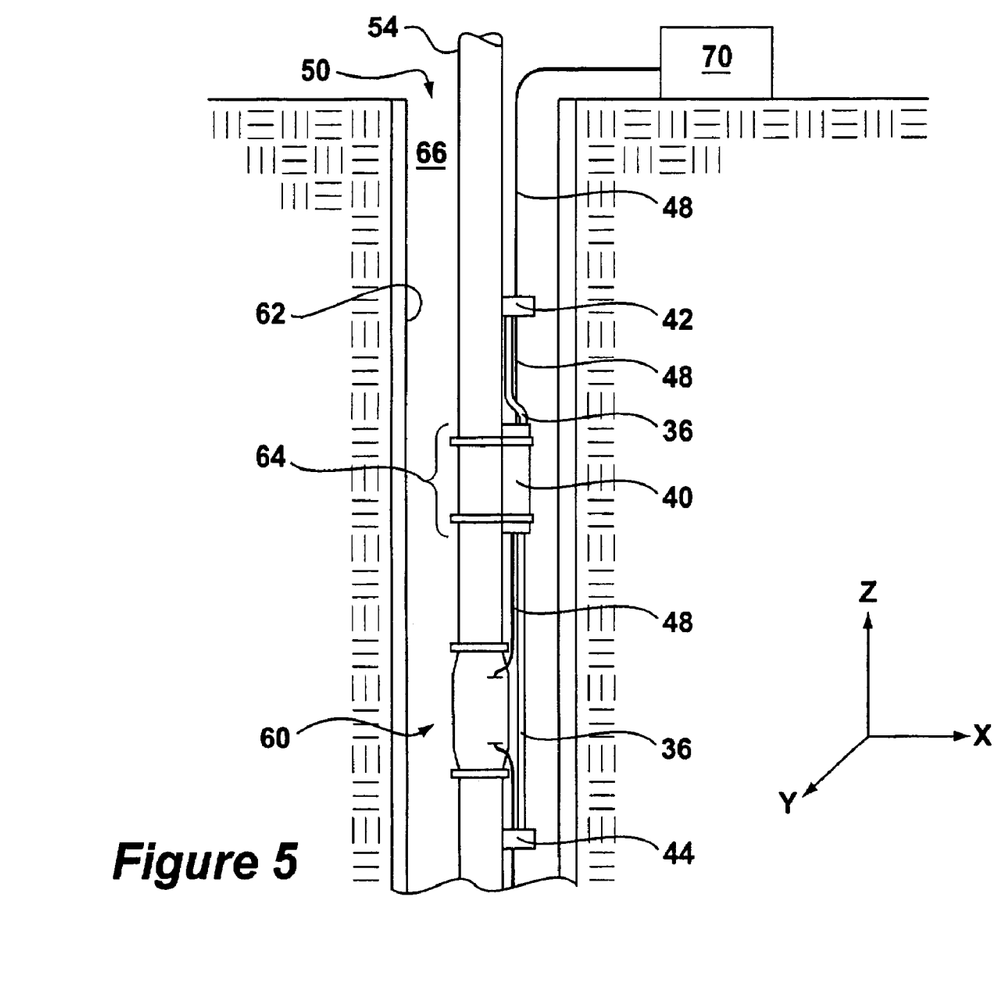
FIG. 5 illustrates an oil/gas well incorporating the disclosed differential pressure transducer assembly.

In significant part, the housing 41 houses the transducer 10 and an optical fiber feedthrough 47, and as noted has various chambers and channels milled therein. Chamber 43 houses the transducer 10, while connected chamber 105 provides a means for inserting the feedthrough 47 into the housing before securing it at the end of the housing, and/or to allow an optical splice to be formed between the transducer 10 and the feedthrough 47 if necessary. After the feedthrough is secured in place, a cover 100 is welded in place on the outside of the housing. The transducer 10, is first affixed to housing 41 by welding disk 34 to the housing 41. A channel 74 is formed in the housing 41 in the vicinity of first pressure porthole 37 that communicates with transmission line 36 and first pressure insertion port 49. After plate 104 is welded in place over the channel 74, the first pressure insertion port 49 communicates with a tight seal to the inside of the bellows 38. The outside of the bellows, i.e., chamber 43, similarly communicates with the second pressure via second pressure insertion port 45. Ultimately the first and second pressures are preferably presented to insertion ports 49 and 45 via bellows 42 and 44, as shown in FIG. 5 and discussed later. A cover 102 is welded to pin 32 which is attached to the bottom of the transducer 10. This cover 102 is then welded to the housing 41, sealing pressure chamber 43.

Chamber 43 (and/or adjacent chamber 105) is preferably filled with a benign fluid having a known density such as silicone oil. By so filling the cavity, there is no need to use corrosion resistant metals for the disk 34, bellows 38, and flexure 12. However, the housing 41, transmission line 36 and first and second bellows 42, 44 (FIG. 5) are preferably made from corrosion resistant materials such as nickel-chromium-molybdenum alloys, e.g. Inconel 625 or Inconel 718. Filling the housing cavity 43 filled with fluid also obviates the need to coat the optical element 20 with an external protective buffer layer (e.g., polyimide, silicone, Teflon®, carbon, gold, and/or nickel) to protect the outer surface from damage.

Additional bellows (not shown) may be located at either insertion port 45, 49 to adequately seal the housing cavity 43 from the corrosive environment within the well bore if necessary, or if the insertion ports are to be directly exposed to the well bore in a given application. These insertion port bellows would preferably have a low spring rate so that the insertion port bellows do not absorb the pressures being transferred into the housing 41 for measurement.

As noted earlier, the optical fiber 30 exits the housing 41 by means of a hermetic feedthrough seal 47. Suitable optical fiber feedthroughs are disclosed in U.S. Pat. No. 6,445,868, entitled "Optical Fiber Feedthrough Assembly and Method of Making Same," and U.S. patent application Ser. No. 09/628,264, entitled "Optical Fiber Bulkhead Feedthrough Assembly and Method of Making Same", filed Jul. 28, 2000, which are both incorporated by reference in their entireties. The optical fiber 30 may preferably include some slack within chamber 105 as shown to relieve any excess tension which might be created by compression of the optical element 20 by the flexure 12 or by movement of the housing 41 during transportation, a pressure surge, or thermal expansion of the housing 41. Chamber 105 may contain suitably smooth or rounded edges (not shown) to ensure that the optical fiber 30 does not exceed its bend radius and experience significant optical leakage. Although only one feedthrough 47 is shown, two would be present on opposite ends of the housing 41 if the device were dual-ended. The optical fiber 30 is protected outside of the housing 41 by a metallic cable 48 that protects the optical fiber 30 from the corrosive environment of a typical well bore, as is known. Cable 48 travels through the well bore to connect the transducer 10 with surface instrumentation or other optical devices deployed in the well bore.

FIG. 5 illustrates a typical oil/gas well 50 incorporating the disclosed differential pressure transducer. The well 50 includes a casing 62, a production tubing 54, and an annulus 66. The differential pressure assembly 40 attaches to the production tubing 54 by use of clamp mechanism 64, many of which are well known in the art. A flow meter 60, such as those incorporated earlier in this disclosure, is positioned on the production tubing at a location further down hole from the differential pressure assembly 40. The flow meter 60 provides measurements of the fluid flowing within the production pipe 54, such as fluid velocity, speed of sound in the fluid, pressure, and temperature, phase fraction, and density. By using the flow meter 60 in conjunction with a differential pressure assembly 40 to measure the hydrostatic pressure difference in the well, these and other fluid parameters may be measured, or may be more accurately measured and/or calculated.

Measuring hydrostatic pressure preferably includes porting two pressures within the well at significantly different depths to the differential pressure assembly 40. Accordingly, a first lower-pressure bellows 42 is located at a predetermined distance up-hole from the assembly 40, such as for example 2 feet. A second higher-pressure bellows 44 is located at a predetermined distance down-hole from the assembly 40, such as 10 feet. The distance between the bellows 42, 44 should be far enough to provide a resolvable differential between the two pressure locations, but close enough that the assembly 40 can be considered to measure a differential pressure at roughly the same axial location as the flow meter 60. (In this regard, note that a separation distance of 50 feet or less can be considered to be at a single location when compared to the overall depth of a typical oil/gas well, which can be tens of thousands of feet deep).

The bellows 42, 44 may comprise any suitable pressure transmission device, such as those disclosed in U.S. Pat. No. 6,439,055, which is incorporated by reference herein. The first and second bellows 42, 44 tap into the production tubing 54, and respectively transfer the production tubing pressures to first and second pressure insertion ports 49 and 45 on the assembly 40 via transmission lines 36. The bellows 42, 44 and lines 36, like the transducer, are fluid filled (e.g., silicone or other oil) to form a completely sealed system. Thereafter, the differential pressure is measured as specified above, using instrumentation unit 70 to interrogate the assembly 40 to interpret and process the reflected signal therefrom. As means for interrogating the sensors and interpreting and processing their reflections are well known, they are not further discussed.

The disclosed design is rugged and can tolerate overpressure conditions caused by high-pressure pulses, which might be caused for example by a perforation in the production tubing 54. Because both sides of the assembly 40 will see the pressure pulse, they will counteract each other to prevent a destructive pressure differential within the assembly 40. Moreover, the first and second bellows 42, 44 will experience any pressure pulses before the components within the assembly, and thus the bellows will prophylacticly absorb some amount of energy of this pulse.

The disclosed differential pressure assembly 40 is also particularly useful in conjunction with a venturi to determine fluid flow rate and fluid density. In this regard, the reader is referred to U.S. patent application Ser. No. 10/186,382, which has been incorporated herein and is discussed in some detail in the Background section of this disclosure. Essentially, by porting the differential pressure created across the venturi to the pressure insertion ports 49 and 45 on the assembly 40, the differential pressure can be accurately measured, even if it is quite small.

While preferably used to sense differential pressures, the disclosed transducer 10 can also be used to sense absolute pressure. For example, the bellows 38 may be sealed (i.e., at porthole 37) to contain a constant first pressure, or may contain a device with a constant or predictable amount of give, such as a spring or diaphragm. Second pressure may then be ported into the housing 41 as noted earlier to displace the device. Knowing the effect of the constant pressure of the bellows/spring/diaphragm on the flexure 12, the amount of flexure stress imparted by the second pressure can be calculated or determined. The same is true if the second pressure within the housing 41 is kept constant, and the first pressure within the bellows 38 is allowed to vary.

Moreover, while it is preferred that the flexure 12 house an optical sensing element 20, other non-optical sensing elements (e.g., electrical sensing elements, piezoelectric crystals, or strain gauges) that are sensitive to pressure could be used in place of the optical sensing element. If such a modification is desirable, one skilled in the art will realize that structural modifications may need to be made to couple the compressive force of the flexure 12 to the sensing element, which might be greatly different in size and shape when compared to the disclosed optical sensing element 20.

"Coupled" as used in this disclosure should not necessarily be interpreted to require direct contact. Thus, two elements can be said to be "coupled" from a functional standpoint even if an intermediary element intervenes between them.

As used herein, "fiber Bragg grating" or "FBG" do not necessary imply that the grating is contained within a fiber, i.e., a standard communications optical fiber. Any suitable grating for simplicity, and consistent with common nomenclature, is referred to herein as an "fiber Bragg grating" or "FBG" even if it is contained within larger diameter waveguides (e.g., "canes") which are not fibers, such as those disclosed herein and preferably used in connection with the optical sensing element 20.

Although designed as particularly useful for measuring differential pressures in oil/gas well applications, the disclosed transducer can be used to sense differential or absolute pressures in any number of applications, including other industrial sensing applications.

What is claimed is:

1. A pressure sensor, comprising:
   a flexure;
   a flexible pressure isolation member for providing a force on the flexure; and
   an optical sensor coupled to the flexure and having a first axis, wherein at least a portion of the optical sensor is deformable along the first axis,
   wherein the optical sensor is deformable by application of the force on the flexure perpendicular to the first axis, wherein the force is indicative of the pressure to be sensed.

2. The pressure sensor of claim 1, wherein the sensor senses a differential pressure, and wherein the force is indicative of the differential pressure.

3. The pressure sensor of claim 1, wherein the flexure is rhomboid shaped.

4. The pressure sensor of claim 1, wherein the optical sensor comprises a pressure sensitive FBG.

5. The pressure sensor of claim 4, wherein the optical sensor further comprises at least one temperature sensitive FBG.

6. The pressure sensor of claim 5, wherein the temperature sensitive FBG is not located at a deformable portion of the optical sensor.

7. The pressure sensor of claim 4, further comprising a temperature compensator block along the first axis between at least one end of the optical sensor and the flexure, wherein the temperature compensator thermally expands to compress the optical sensor along the first axis to counteract thermal expansion of the optical sensor.

8. The pressure sensor of claim 1, further comprising a housing, wherein the flexure is affixed to the housing.

9. The pressure sensor of claim 8, wherein the housing is filled with a liquid.

10. The pressure sensor of claim 1, wherein the optical sensor has a narrowed portion surrounded by thicker portions.

11. The pressure sensor of claim 10, wherein a pressure sensitive FBG is located at the narrowed portion.

12. The pressure sensor of claim 11, wherein the optical sensor is deformable by virtue of engagement between the flexure and the thicker portions.

13. The pressure sensor of claim 1, wherein the optical sensor is contained within the flexure.

14. The pressure sensor of claim 1, wherein the flexible pressure isolation member comprises a bellows.

15. The pressure sensor of claim 1, wherein the flexible pressure isolation member contains a first pressure to be measured.

16. The pressure sensor of claim 1, wherein flexure and the flexible pressure isolation member are housed in a housing, and wherein the housing contains a second pressure to be measured.

17. The pressure sensor of claim 1, wherein flexure and the flexible pressure isolation member are housed in a housing, and wherein the housing contains a second pressure and the flexible pressure isolation member contains a first pressure, and wherein the force is indicative of the difference between the first and second pressures.

18. A pressure sensor, comprising:
   an optical sensor contained within a flexible body and at least partially compressible by the body along a first axis;

a flexible pressure isolation member for providing a force on the flexible body; and a temperature compensator block between at least one end of the optical sensor and the body, wherein the temperature compensator thermally expands to compress the optical sensor along the first axis to counteract thermal expansion of the optical sensor.

19. The pressure sensor of claim 18, wherein the body is rhomboid shaped.

20. The pressure sensor of claim 18, wherein the optical sensor is compressed by the body by an application of a force on the body, wherein the force is indicative of a pressure being sensed.

21. The pressure of claim 20, wherein the force is applied perpendicularly to the first axis.

22. The pressure sensor of claim 18, wherein the optical sensor comprises a pressure sensitive FBG.

23. The pressure sensor of claim 22, wherein the optical sensor further comprises at least one temperature sensitive FBG.

24. The pressure sensor of claim 23, wherein the temperature sensitive FBG is not located at a compressible portion of the optical sensor.

25. The pressure sensor of claim 18, further comprising a housing, wherein the body is affixed to the housing.

26. The pressure sensor of claim 18, wherein the optical sensor has a narrowed portion surrounded by thicker portions.

27. The pressure sensor of claim 26, wherein a pressure sensitive FBG is located at the narrowed portion.

28. The pressure sensor of claim 27, wherein the optical sensor is compressible by virtue of engagement between the body and the thicker portions.

29. A pressure sensor, comprising:

a deformable flexure;

a sensor coupled to the flexure and having a first axis, wherein the sensor is at least partially deformable along the first axis as the flexure deforms; and a deformable pressure isolation member coupled to the flexure for deforming the flexure, wherein the deformable pressure isolation member deforms in accordance with the pressure being measured.

30. The pressure sensor of claim 29, wherein the sensor senses a differential pressure, and wherein the deformation of the deformable pressure isolation member is indicative of the differential pressure.

31. The pressure sensor of claim 29, wherein the flexure is rhomboid shaped.

32. The pressure sensor of claim 29, wherein the sensor is an optical sensor.

33. The pressure sensor of claim 32, wherein the optical sensor comprises a pressure sensitive FBG.

34. The pressure sensor of claim 33, wherein the optical sensor further comprises at least one temperature sensitive FBG.

35. The pressure sensor of claim 34, wherein the temperature sensitive FBG is not located at a deformable portion of the optical sensor.

36. The pressure sensor of claim 32, wherein the optical sensor has a narrowed portion surrounded by thicker portions.

37. The pressure sensor of claim 36, wherein a pressure sensitive FBG is located at the narrowed portion.

38. The pressure sensor of claim 37, wherein the optical sensor is deformable by virtue of engagement between the flexure and the thicker portions.

39. The pressure sensor of claim 29, further comprising a temperature compensator block along the first axis between at least one end of the sensor and the flexure, wherein the temperature compensator thermally expands to compress the sensor along the first axis to counteract thermal expansion of the sensor.

40. The pressure sensor of claim 29, further comprising a housing, wherein the flexure is affixed to the housing.

41. The pressure sensor of claim 40, wherein the housing is filled with a liquid.

42. The pressure sensor of claim 29, wherein the sensor is contained within the flexure.

43. The pressure sensor of claim 29, wherein the deformable pressure isolation member comprises a bellows.

44. The pressure sensor of claim 43, wherein the bellows contains a first pressure.

45. The pressure sensor of claim 43, wherein the flexure and the bellows are housed in a housing, and wherein the housing contains a second pressure.

46. The pressure sensor of claim 43, wherein the flexure and the bellows are housed in a housing, and wherein the housing contains a second pressure and the bellows contains a first pressure, and wherein the deformation of the bellows is indicative of the difference between the first and second pressures.

47. A pressure sensor, comprising:

a deformable flexure;

a sensor coupled to the flexure and having a first axis, wherein the sensor is at least partially deformable along the first axis as the flexure deforms; and a flexible pressure isolation member coupled to the flexure, wherein an inside of the flexible pressure isolation member is exposable to a first pressure, and an outside of the flexible pressure isolation member is exposable to a second pressure, wherein the flexible pressure isolation member deforms the flexure in accordance with the difference between the first and second pressures.

48. The pressure sensor of claim 47, wherein the sensor comprises an optical sensor.

49. The pressure sensor of claim 48, wherein the sensor comprises a pressure sensitive FBG.

50. The pressure sensor of claim 49, wherein the optical sensor further comprises at least one temperature sensitive FBG.

51. The pressure sensor of claim 50, wherein the temperature sensitive FBG is not located at a deformable portion of the optical sensor.

52. The pressure sensor of claim 48, wherein the sensor has a narrowed portion surrounded by thicker portions.

53. The pressure sensor of claim 52, wherein a pressure sensitive FBG is located at the narrowed portion.

54. The pressure sensor of claim 53, wherein the optical sensor is deformable by virtue of engagement between the flexure and the thicker portions.

55. The pressure sensor of claim 47, further comprising a temperature compensator block along the first axis between at least one end of the sensor and the flexure, wherein the temperature compensator thermally expands to compress the sensor along the first axis to counteract thermal expansion of the sensor.

56. The pressure sensor of claim 47, further comprising a housing, wherein the flexure and flexible pressure isolation member are affixed to the housing.

57. The pressure sensor of claim 56, wherein the housing is filled with a liquid.

58. The pressure sensor of claim 47, wherein the flexible pressure isolation member comprises a bellows.

59. The pressure sensor of claim 47, wherein the flexible pressure isolation member deforms the flexure along an axis perpendicular to the first axis.

60. A method for sensing a pressure using an optical sensor contained within a flexible body along a first axis, comprising placing a force indicative of the pressure being sensed on the body along a second axis perpendicular to the first axis, thereby deforming the body and at least a portion of the optical sensor along the first axis, wherein placing a force indicative of the pressure being sensed on the body comprises presenting the pressure to a flexible pressure isolation member that is coupled to the flexible body to provide the force thereto.

61. The method of claim 60, wherein the sensor senses a differential pressure, and wherein the force is indicative of the differential pressure.

62. The method of claim 60, wherein the flexible body is rhomboid shaped.

63. The method of claim 60, wherein the optical sensor comprises a pressure sensitive FBG.

64. The method of claim 63, wherein the optical sensor further comprises at least one temperature sensitive FBG.

65. The method of claim 64, wherein the temperature sensitive FBG is not located at a deformable portion of the optical sensor.

66. The method of claim 63, further comprising compensating for temperature effects by positioning a temperature compensator block along the first axis between at least one end of the optical sensor and the flexible body, wherein the temperature compensator thermally expands to compress the optical sensor along the first axis to counteract thermal expansion of the optical sensor.

67. The method of claim 60, wherein the flexible body is affixed within a housing.

68. The method of claim 67, wherein the housing is filled with a liquid.

69. The method of claim 60, wherein the optical sensor has a narrowed portion surrounded by thicker portions.

70. The method of claim 69, wherein a pressure sensitive FBG is located at the narrowed portion.

71. The method of claim 70, wherein the optical sensor is deformed by virtue of engagement between the flexible body and the thicker portions.

72. The method of claim 60, wherein the flexible pressure isolation member comprises a bellows.

73. The method of claim 60, wherein the flexible pressure isolation member contains a first pressure to be measured.

74. The method of claim 60, wherein the flexible body and the flexible pressure isolation member are housed in a housing, and wherein the housing contains a second pressure to be measured.

75. The method of claim 60, wherein the flexible body and the flexible pressure isolation member are housed in a housing, and wherein the housing contains a second pressure and the flexible pressure isolation member contains a first pressure, and wherein the force indicative of the pressure being sensed is indicative of the difference between the first and second pressures.

* * * * *